F. MAUS.
DEHYDRATING APPARATUS.
APPLICATION FILED JAN. 20, 1921.
1,413,924.
Patented Apr. 25, 1922.
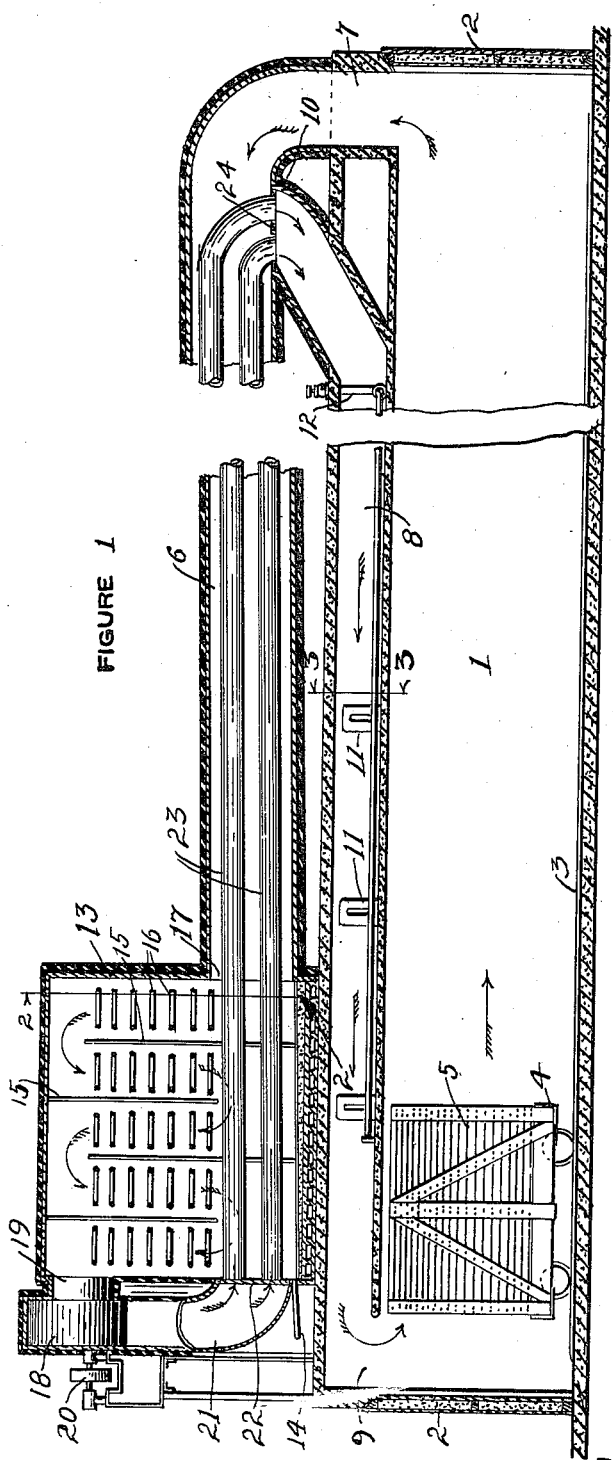
FIGURE 1
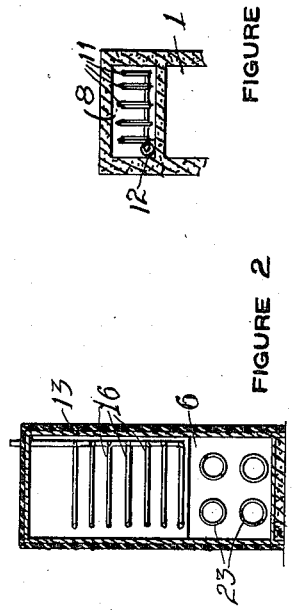
FIGURE 2
FIGURE 3
INVENTOR
Frank Maus
BY John A. Naismith
ATTORNEY

UNITED STATES PATENT OFFICE.

FRANK MAUS. OF SAN JOSE, CALIFORNIA, ASSIGNOR OF ONE-HALF TO SIEBREN J. SPOELSTRA, OF SAN JOSE, CALIFORNIA.

DEHYDRATING APPARATUS.

1,413,924.      Specification of Letters Patent.     Patented Apr. 25, 1922.

Application filed January 20, 1921. Serial No. 438,713.

*To all whom it may concern:*

Be it known that I, FRANK MAUS, a citizen of the United States, and resident of San Jose, in the county of Santa Clara and State of California, have invented certain new and useful Improvements in Dehydrating Apparatus, of which the following is a specification.

My invention relates particularly to a method and apparatus for low temperature dehydration.

It is the object of my invention to provide a dehydrator that will be simple and economical in construction and operation, highly efficient in its practical application, and particularly that conserves and utilizes the latent heat of evaporation in maintaining the temperature of the dehydrating air at the required point.

In the drawing:

Figure 1 is a vertical and longitudinal section through my improved dehydrator, part being broken away.

Figure 2 is a section on line 2—2 of Figure 1.

Figure 3 is a section on 3—3 of Figure 1.

Referring more particularly to the drawing, I provide at 1 a heat insulated tunnel or chamber fitted with doors 2—2 and a track 3 upon which suitable trucks as 4 are mounted carrying trays 5 laden with material such as prunes, nuts, apricots etc., to be dried.

At 6 is shown a slightly inclined heat insulated conduit arranged over tunnel 1 and communicating directly with one end thereof as at 7. A passage 8 is arranged over chamber 1 and communicates therewith at the end opposite to the passage 7 and terminates at a point 10 adjacent said passage 7. A series of heating units as steam radiators, are arranged in passage 8 as at 11, a supply pipe being shown at 12.

Over chamber 1 and passage 8 at end 9 thereof is built a heat insulated chamber 13 provided with a drain at 14, a series of baffle plates at 15 and refrigerating coils at 16. This chamber 13 has open communication at 17 with conduit 6 and through conduit 6 with tunnel or chamber 1. At 18 is shown a fan communicating with chamber 13 at 19 and operated through the medium of a pulley at 20, a discharge pipe being shown at 21 terminating in a plate 22 into which are set the ends of pipes 23.

Pipes 23 are arranged in conduit 6 and extend from pipe 21 to the end 10 of passage 8 with which they communicate through plate 24 in which they are mounted.

Assuming then that the fan 18 is operating, the air in the dehydrator will move in the direction indicated by the arrows, namely, past the heat units 11 to end 9 and then through the dehydrating chamber 1, thence through passage 7 and conduit 6 around pipes 23 to condenser chamber 13 where it passes around the refrigerating coils to fan 18. From fan 18 the air passes through pipe 21 and pipes 23 to be discharged into passage 8 again.

Assuming again that in the present case the heating and cooling units and the fan are in full operation and the temperature of the air in chamber 1 sufficiently raised to effect the desired dehydration of a quantity of walnuts on trays 5. The dehydrating air is loaded with moisture from the nuts as it passes through chamber 1, its temperature being somewhat lowered by contact with the nuts at the existing atmospheric temperature. Upon entering conduit 6 this moisture laden air contacts with all sides of pipes 23 through which the colder dry air is returning to passage 8. The heat in the moisture of the air in conduit 6 includes, of course, a percentage of latent heat of evaporation therefore during its passage through conduit 6 where it is subjected to a progressively lowering temperature, there is a progressive lowering of the temperature of this moisture laden air accompanied by a progressive surrendering of latent heat of evaporation and sensible heat. The latent heat of evaporation released as above set forth is absorbed by pipes 23 and the dry cool air moving therethrough as sensible heat, and the sensible heat surrendered by said air is absorbed by said dry air through pipes 23, the surrendering of heat of course causing a condensation of moisture which is collected in the bottom of conduit 6 and chamber 13 and carried off through drain 14.

This continued lowering of temperature and surrendering of heat is carried on until the air passes out of chamber 13 through fan 18 and returned to pipes 23 where it absorbs heat from the moisture laden air as described. In passing from pipe 21 to conduit 6 the conduits 23 pass through chamber 13 so that the cold air entering conduits 23 assists in reducing the temperature of the air passing through the condenser chamber 13. There is, of course, a material and unrecoverable loss of heat in the above process so that the air discharged from end 10 of pipes 23 has not the requisite temperature to be successfully used again for dehydrating purposes in chamber 1, therefore the heating units 11 are provided in passage 8 to raise the temperature of the air passing therethrough to the required point.

By the method of dehydrating hereinbefore disclosed a comparatively small amount of air can be used over and over again and alternately reduced to a sufficiently low temperature to extract the moisture therefrom and raised to a suitable dehydrating temperature with a minimum expenditure of work by the heating and refrigerating units.

It is clear from the above that in a dehydrator of this type there is a minimum loss of heat since a substantial portion of the sensible heat of the moist dehydration air is absorbed by the cold dry air, thereby requiring but a slight addition of heat thereto to raise it to the required dehydration temperature whereas ordinarily all of the heat required to raise the temperature of the dry air from the refrigerating temperature to the dehydrating temperature must be supplied from extraneous sources.

It is to be understood of course, that while I have herein shown and described one particular embodiment of my invention this disclosure is to be considered as illustrative only and in no way to limit the scope of the invention as defined by the following claims.

I claim:—

1. A dehydrator including a dehydrating chamber, a refrigerating chamber, conduits connecting, respectively, the discharge end of one chamber with the receiving end of the other chamber, one conduit having a portion of its length enclosed by the other conduit, means for creating a circulation of air through said chambers and conduits, and means for heating the air at a given point in its circulation.

2. A dehydrator including a dehydrating chamber, a refrigerating chamber, a conduit connecting the discharge portion of the refrigerating chamber with one end of the dehydrating chamber, a second conduit connecting the receiving portion of the refrigerating chamber with the other end of the dehydrating chamber, said first mentioned conduit having a portion of its length enclosed in said second mentioned conduit, means for circulating air through said conduits and chambers, and means for heating said air in said first mentioned conduit subsequently to its passage through said second mentioned conduit.

3. A closed circuit air circulating system having one intermediate portion thereof passing through another intermediate portion thereof thereby forming terminal loops, a refrigerating device operatively inserted in one of said loops, and a heating device and dehydrating chamber operatively arranged in the other loop.

4. A dehydrator including a dehydrating chamber, a heating conduit arranged thereover and communicating with one end thereof, a refrigerating chamber arranged over said heating chamber, a conduit connecting said refrigerating chamber with the other end of said dehydrating chamber, baffle plates arranged in said refrigerating chamber, refrigerating units arranged between said baffle plates, a fan operatively connected to said refrigerating chamber, a plurality of pipes communicating with said fan and extending through said refrigerating chamber and the conduit connecting the same with said dehydrating chamber and discharging into said heating conduit, and heating units arranged in said heating conduit.

5. A dehydrator including a dehydrating chamber, a refrigerating chamber, a conduit connecting the discharge end of the dehydrating chamber with the receiving end of the refrigerating chamber, and a conduit connecting the receiving end of the dehydrating chamber with the discharge end of the refrigerating chamber and passing through said first mentioned conduit and said refrigerating chamber.

FRANK MAUS.